METHOD AND APPARATUS FOR CUTTING AND SPLICING PICTURE SYNCHRONIZED SOUND RECORDINGS

Filed Nov. 14, 1966

Inventor:
OTTO BÜHLER
By
OSTROLENK, FABER, GERB & SOFFEN
ATTORNEYS

Inventor:
OTTO BÜHLER
By
Ostrolenk, Faber, Gerb & Soffen
ATTORNEYS

Inventor:
OTTO BÜHLER

By
Ostrolenk, Faber, Gerb & Soffen
ATTORNEYS

March 24, 1970 O. BÜHLER 3,502,397

METHOD AND APPARATUS FOR CUTTING AND SPLICING PICTURE SYNCHRONIZED SOUND RECORDINGS

Filed Nov. 14, 1966 5 Sheets-Sheet 4

Inventor:
OTTO BÜHLER

By
OSTROLENK, FABER, GERB & SOFFEN
ATTORNEYS

Inventor:
OTTO BÜHLER
By
OSTROLENK, FABER, GERB & SOFFEN
ATTORNEYS

United States Patent Office 3,502,397
Patented Mar. 24, 1970

3,502,397

METHOD AND APPARATUS FOR CUTTING AND SPLICING PICTURE SYNCHRONIZED SOUND RECORDINGS

Otto Bühler, Bavaria, Germany, assignor to Riva film- und lichttechnische Betriebe GmbH., Unterfohring, near Munich, Germany Filed Nov. 14, 1966, Ser. No. 594,010
Claims priority, application Germany, Nov. 19, 1965, R 42,026
Int. Cl. G03b 31/04
U.S. Cl. 352—5 23 Claims

ABSTRACT OF THE DISCLOSURE

For accomplishing phase-coherent splicing of pilot-frequency controlled tape in post-synchronization a starter film is connected between the beginning and end of a film strip to form an endless loop. The starter film has light and dark hands which are projected onto a plane being scanned by a pair of scanning photo diodes mounted at diametrically opposite points on a rotating cylindrical carrier. The signal produced by the photo diodes is phase-coherent with the pilot frequency and serves as a signal for locating the splicing point.

For synchronizing sound motion pictures and video tapes, the sound is first recorded in scenes and sections on a sound tape; then selected sections of this tape are joined, mixed with music and additional sound or noise, and copied into the sound track in the form of magnetic or optical sound. The individual scenes or cuts of the film to be synchronized are combined, with the addition of a starter film between the end and the start of the scene, to form an endless loop, and during the run of this loop, the text is recorded on a magnetic tape, whilst the optically visible indications on the starter film serve as cues for the actors.

With unperforated magnetic tapes, the cutting and joining of the selected sections in synchronization with the recorded picture present a problem. Generally, the synchronization between film strip and unperforated magnetic tape is obtained by means of a pilot frequency recorded on the tape. However, the joining of picture-synchronized sound recordings on pilot-controlled magnetic tapes is only successful if the phase of the recorded pilot frequency of both parts to be joined is completely coincident.

In a known method, a control is effected by means of a magnetic edge track of a synchronous starter film, and the cutting points are marked by needle impulses which are detected by means of a Hall probe and displayed on an instrument, and determine in this manner the start and the end of the picture. Although these impulses, produced by an electronic counter, are recorded with absolute accuracy, errors in the phase are nevertheless unavoidable, because the film loop will have necessarily different lengths in the section between the magnetic head detecting the edge track and the picture gate. For constructional reasons it is not possible to arrange the magnetic head directly at the picture gate of the projector, and the minimum distance from the picture gate which is unavoidable for constructional reasons can lead to differences in the length of the film strip between window and magnetic head which can result in an unacceptable deviation in the phase position. Although the pilot frequency generator mounted on the projector generates a voltage locked in phase to the picture gate, for the reasons hereinbefore indicated there occurs a shift of the phase of the cutting impulses, controlled by the magnetic edge track in accordance with the length of the film loop relative to the pilot frequency. In addition, with this known method, there is the danger that the magnetic track might itself give rise to faults, due to missing out and lifting at the glued joint.

The present invention relates to a method and an apparatus for cutting picture synchronized sound recordings, especially on a pilot frequency controlled magnetic tape, usnig a starter film interposed between the start and the end of the picture of the film strip to be synchronized and by means of which this film strip is formed into an endless loop, whereby the drawbacks of known methods may be avoided and the joining of picture synchronized sound recording may be effected in in-phase relationship.

In order to realize this object, the method is so carried out that at least one impulse is recorded on the magnetic tape in locked phase relationship to the pilot frequency or other mechanical or magnetic periodical markings on this tape, which impulse is obtained by reflecting an optical marking in the starter film from the beam of the projector; the magnetic tape is then cut at a point spaced a certain predetermined distance from the said recorded impulse, the said distance corresponding in time to the distance between the optical marking of the starter film and the start or end of the picture, respectively. Since the impulse recorded on the magnetic tape corresponds in its temporal, and consequently also in its longitudinal arrangement accurately to the marking of the starter film, located in the picture gate and reflected out of the projector beam, the phase cannot be adversely affected by any longitudinal differences of the film loop.

The method according to the invention may be used advantageously also for synchronizing a video tape for television plays or the like, after the video tape has been transferred to a film. Under these conditions a recording of, say, 90 minutes may be made on a single, unperforated reel of magnetic tape, which would not be possible on perforated magnetic tapes usually used for this purpose, owing to their greater thickness.

In order to reduce to a minimum the fixed distances from the recording impulse on the magnetic tape, corresponding to the optical marking on the starting strip, and to enable a simple cutting gage to be used, there is provided, according to a further feature of the invention, at least near the start and the end of the picture on the loop, an optically detectable marking in the starter film, which is recorded near the start and end, respectively, of the magnetic tape section so that the cut can always be made at a fixed, but comparatively small distance in front of, or behind, the associated impulse.

However, from the point of view of the method, it has been found convenient to record, not only a starting and a finishing impulse, but by means of optically scanning optical markings in each individual frame of the starter film, an impulse sequence frequency in phase-locked relationship to the pilot frequency, and to effect the cutting at a fixed distance from the first or last impulse, respectively. In order to maintain a certain minimum gap between impulse and cutting point to enable a cutting device to be mounted at a sufficient distance from the magnetic head detecting the impulse, the optical markings on the starter film commence conveniently a few frames after the end of the film strip, and after the last marked frame on the starter strip, several frames are left blank, i.e., are blacked out, before the start of the film section.

The execution of the method according to the invention poses a further problem, namely that of distinguishing between the picture content of the optical markings on the starter film strip and the picture content on the film strip to be synchronized. According to the invention, this object is realized in that, for clearly distinguishing between the optical markings on the starter strip and the picture content of the picture strip, the optical markings have the form of alternating light-dark informations, the scanning of which gives an impulse frequency which, when detected by the magnetic head, defines that point of the strip from which the distance of the cut must be measured. This optical light-dark signal, which is evaluated as described further below, may be so formed in the number and arrangement of the light-dark cycles, that any similarity with the informations on the picture strip is avoided. For example, if, according to a preferred embodiment, the impulse frequency in the audio frequency range, produced by the light-dark information on the starter strip and the scanning of this information, is within the range of, say 2000 to 4000 cycles per second, it has been shown by tests that interference by the information content of the film strip is practically impossible, if these signals, corresponding to the optical marking, are guided by means of a narrow band amplifier tuned to the impulse frequency, before they are recorded on the magnetic tape.

The recording of the impulses in the audio frequency range has also the further advantage that the impulses make possible acoustic identification by passing along the magnetic head so that the distance to the cutting point on the magnetic tape can be determined by the simplest possible means.

According to a preferred embodiment of the invention, the scanning of the optical markings on the starter film reflected out of the projector beam is effected by photoelectric switching elements which scan the images of the optical markings on the starter strip, produced by an auxiliary optical arrangement, in synchronism to the frame change frequency and pass, to this end, preferably along a circular path periodically past the image of the marking.

The photoelectric switching elements, preferably in the form of photodiodes, rotate preferably at such a speed that the picture marking is scanned twice during each starter strip frame, whilst the same is visible in the projector beam during the light phase of the projector. The rotor carrying the photodiodes is conveniently rigidly connected with the pilot frequency generator, having preferably the form of a magnetic pill rotor.

Preferably, the narrow band amplifier may be simultaneously so constructed and equipped that it switches from the impulse frequency to modulation and vice versa as a function of a discreet impulse which corresponds to a certain optical marking on the starter strip. The first impulse of the starter strip, that is to say, the impulse nearest the picture end of the endless loop, serves for the reversal for recording the modulation. A second impulse may then define the distance to the end of the picture, whilst the last impulse of the starter strip determines the distance to the start of the picture.

According to the invention, the object of synchronizing the frame alternation frequency with the phase position of the rotation of the rotor carrying the photodiodes is realized by controlling the motor driving the rotor carrying the photodiodes as a function of the light phase in the projector beam path.

In a preferred embodiment of the invention, the said motor is a hysteresis motor which forms its poles only after it has run up to speed and is therefore capable of engaging at any point. In order to effect this engagement synchronously with the frame run, according to yet another feature of the invention, two switching photodiodes are mounted on the rotor, offset by 90° relative to the impulse photodiodes, in order to delay, by means of a switching amplifier and a suitable relay, the running up to speed of the motor by a short-duration interruption of the supply of the motor until the motor remains "locked" in the light phase of the projector shutter so that the impulse sequence diodes record two impulses on the magnetic tape during each frame.

Further features and advantages of the invention will become apparent from the following description and the appended claims, in conjunction with the accompanying drawings, showing an embodiment of an apparatus adapted to carry out the method according to the invention, and in which:

Figure 1:
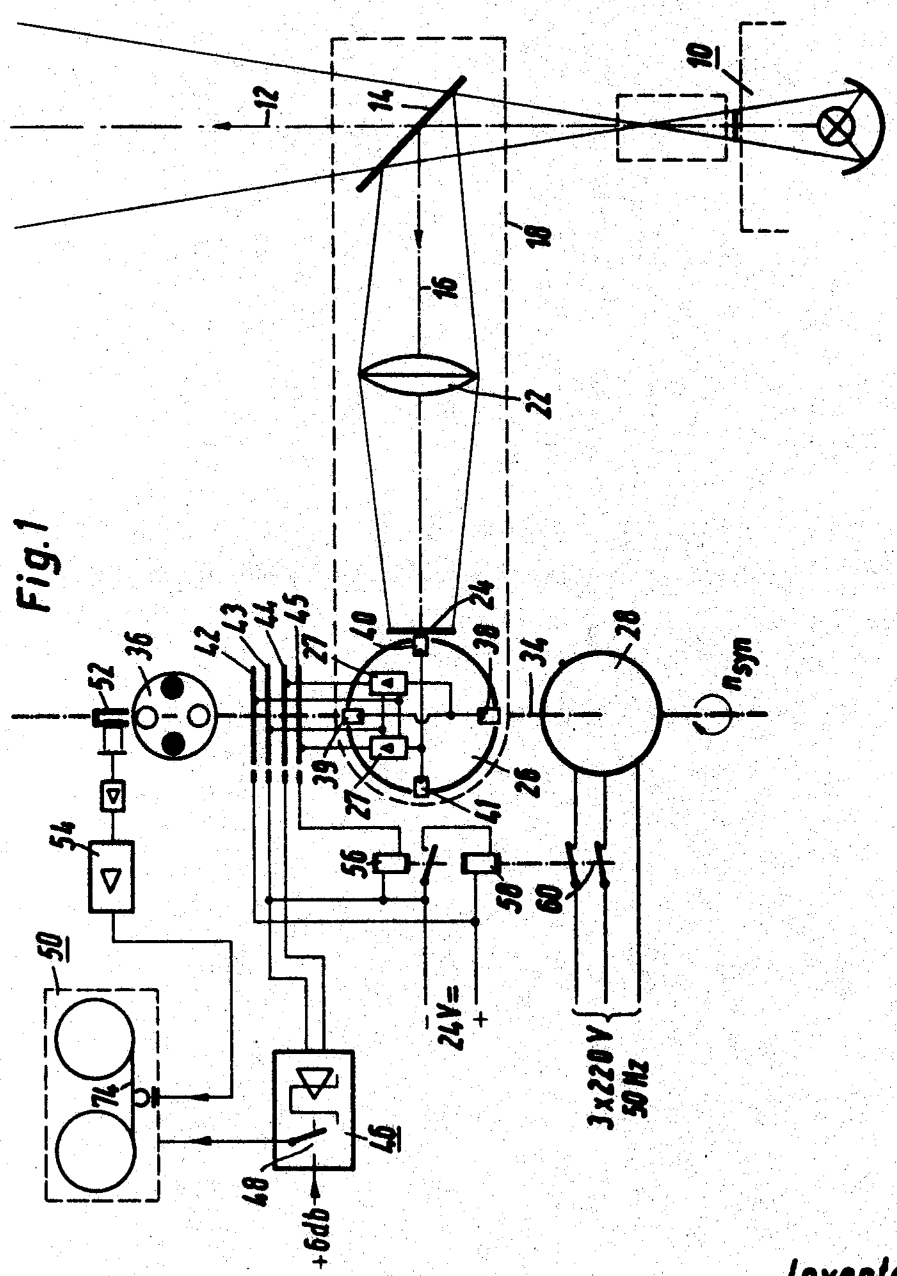
FIG. 1 shows diagrammatically the arrangement for scanning and recording picture-synchronized impulses.
Figure 4:
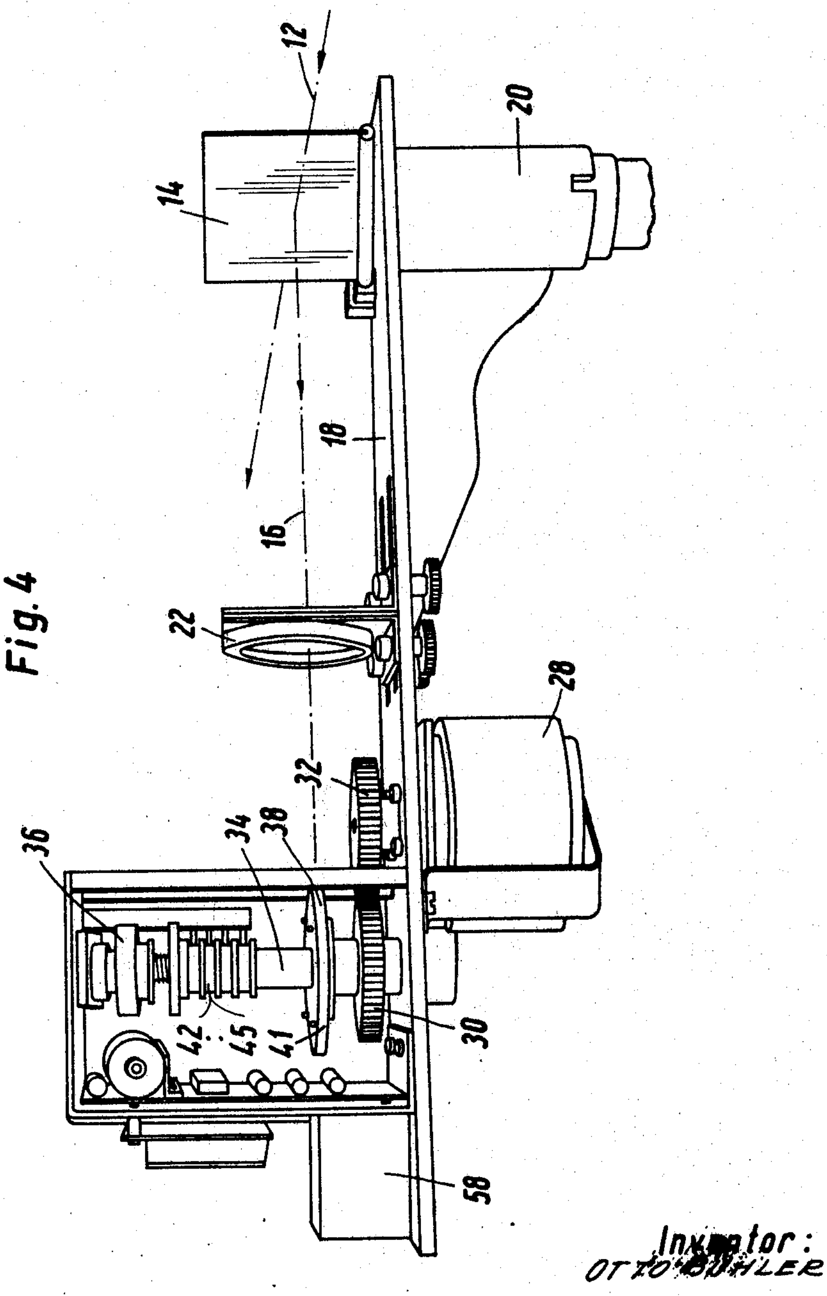
FIG. 4 shows the scanning unit, adapted to be switched into the beam of the projector.

FIG. 1 shows the basic arrangement for the cutting and splicing of picture-synchronized sound recordings on pilot frequency controlled magnetic tapes. The film projector 10 projects an endless loop, consisting of the film strip section to be synchronized and a starter film according to FIG. 2, inserted between the start and the end of this strip. A partly transparent mirror 14 is mounted in the path of the projector 10; for the purpose of reflecting the markings of the starter film strip, a glass plate is sufficient so that the brightness on the projection screen remains substantially unaffected. This mirror 14 mounted in the projection axis 12 of the projector, partially deflects the beam, conveniently so that the optical axis 16 of the deflected beam forms a right angle with the projection axis 12. As shown in FIG. 4, the mirror 14 is mounted on a support plate 18, which is mounted on a column 20 arranged to pivot about a horizontal axis intersecting preferably the projection axis 12 of the projector. The support plate 18 carries an optical reproduction systme 22, producing a reproduction of the reflected picture of the optical marking of the starter strip in a picture plane 24. This picture plane 24 is immediately adjacent to the periphery of a rotor disk 26 driven by a hysteresis motor 28. The motor 28 runs at a synchronous speed of 1500 revolutions per minute. If the film projector has a frame frequency of 25 frames per second, the motor 26 can drive the rotor disk 26 directly. However, if there is the additional requirement of operating with apparatus projecting 24 frames per second, matching may be obtained by utilizing reduction gearing to drive disk 26 from the motor 28. This reduction gearing for matching a film projector with a frequency of 24 frames per second is shown in FIG. 4. The transmission is effected by means of gears 30 and 32, mounted on the shaft 34 of the rotor and on the shaft of the motor, respectively.

The shaft driving the rotor 26 has also fixed thereto a magnetic pill rotor 36 which produces a pilot frequency of 50 c./s. and carries, at a speed of 1500 revolutions per minute, four magnetic pills which co-operate with a collector 52 whereby the pilot frequency of 50 cycles per second is recorded through an amplifier 54 on a magnetic tape 74.

The rotor carries two impulse diodes 38 and 39 arranged diametrically opposite on its periphery, and offset by 90° thereto, two equally dimetrically oppositely located switching diodes 40, 41, in the form of photodiodes and acting therefore as photoelectric transformers. The rotor disk 26 also carries two preamplifiers 27 for the outputs of the impulse diodes and the switching diodes. The outputs of these pre-amplifiers are connected to sliprings 42, 43, 44, 45, arranged on the shaft 34 of the rotor. These sliprings are associated with collector brushes, which form an electrical connection between the output of the impulse diodes and a narrow band amplifier 46, and switching relays 56, 58, respectively. Instead of such slipring arrangement, a contact-less arrangement may be provided, for example, in the form of inductive or capacitive generators.

From this narrow band amplifier, the output impulses of the impulse diodes are applied to the magnetic sound apparatus 50 so that the impulses defining the distance from the nominal cutting position are recorded on the magnetic tape in locked phase relation to the pilot frequency applied through the amplifier 54. The narrow band amplifier 46 is also equipped with a reversing switch 48 adapted to respond to a first impulse and switching from the modulation to the impulse frequency and ensuring that, during the passage of the picture strip to be sunchronized, the associated sound is fixed on the magnetic tape.

Figure 2:
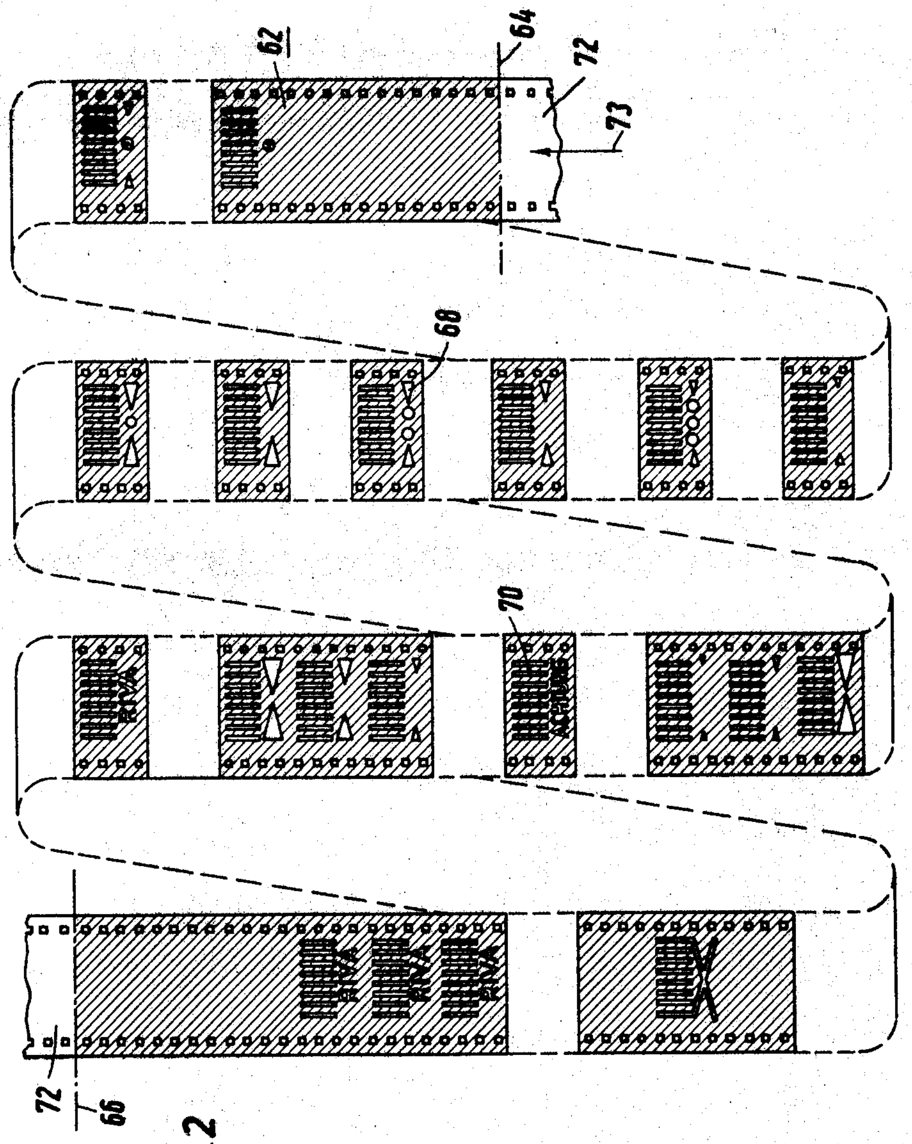
FIG. 2 shows a part of the starter film.

Before describing the operation of the arrangement shown in FIG. 1, the starter film will first be discussed with reference to FIG. 2. This synchronous starter film 62 may consist, for example, of 247 frames which, with the exception of four black frames at the start and three black frames at the end, are all provided over two thirds of the height of the frame wtih a grid of vertical bars 70, and contain in the lower third of the frame the indication markings 68, required for the synchronization. In the embodiment shown, the grid of bars comprises eight parallel light strips. This starter film 62 is glued between the end 66 and the start 64 of the film strip section 72 to be synchronized. The direction of movement is indicated by an arrow 73.

The operation of the arrangement according to the invention is as follows:

The optical marking of the starting film 62 in the form of a grid of bars 70 is reproduced by means of the partially transparent mirror 14, located in front of the optical projection system, and the optical reproduction system 22 in the reproduction plane 24, extending over a comparatively short arcuate section along the periphery of the rotor disk 26. This grid is scanned by the impulse diodes 38, 39 so that under these conditions, each frame is scanned once by the photodiode 38 and once by the photodiode 39, offset against the first one by 180°. Thus, according to the grid spacing, the series-connected amplifier 27 delivers alternating voltage impulses at a frequency of about 2000 cycles per second. Simultaneously, the four magnetic pills arranged on the rotor 36 induce in a coil 52 located above the same a voltage with the pilot frequency of 50 cycles per second. The impulse frequency is recorded instead of the modulation coming from the studio, during the running time of the starter film. In locked phase with the impulse frequency, also the pilot frequency is recorded on the magnetic tape in the manner hereinbefore described.

Since every grid frame located in the gate of the projector 10 is scanned twice during the opening time of the projector shutter, namely once by the diode 38 and once by the diode 39, there results an impulse sequence frequency of 50 cycles per second, formed from the 2000 c./s. alternating frequency, and in-phase with the pilot frequency. From the reproduction width in the tangent of the revolving photodiodes, an impulse width of the individual impulses can be calculated of 0.97 millimetre with a magneic tape moving at 381 millimetres per second. This means that the impulse heard in the loudspeaker or in earphones can be used directly for marking the cutting position. In this case, 15.3 millimetres of magnetic tape correspond to one frame length of the film to be synchronized, whilst the cycle of one 50 cycles per second oscillation of the pilot voltage amounts to 7.62 millimetres. The maximum possible cutting error amounts here in the least favourable case to one quarter of the half-wave and has no adverse effects on the control of the follower control apparatus.

In order to ensure that the rotor disk 26 rotates in such a manner that during each light phase each of the two photodiodes 38 and 39 effects one scanning operation, the invention provides a phase control of the synchronous motor, as hereinafter described.

If the switching diodes 40 and 41, arranged on the rotor 26, scan the grid frame during the light phase, they supply a signal via the slipring to the relay 56. Since the switching diodes 40, 41 are arranged at 90° relative to the impulse diodes 38, 39, these signals are produced only when the phase position of the rotor 26 is not in alignment with the frame change frequency, and in this case the relay 56 energizes the relay 58 which switches off the motor through two phase switches 60. In this way it is possible that the poles of the hysteresis motor 28 form in the desired manner so that the locking can take place in the correct position after a short interruption of both phases.

Figure 3:
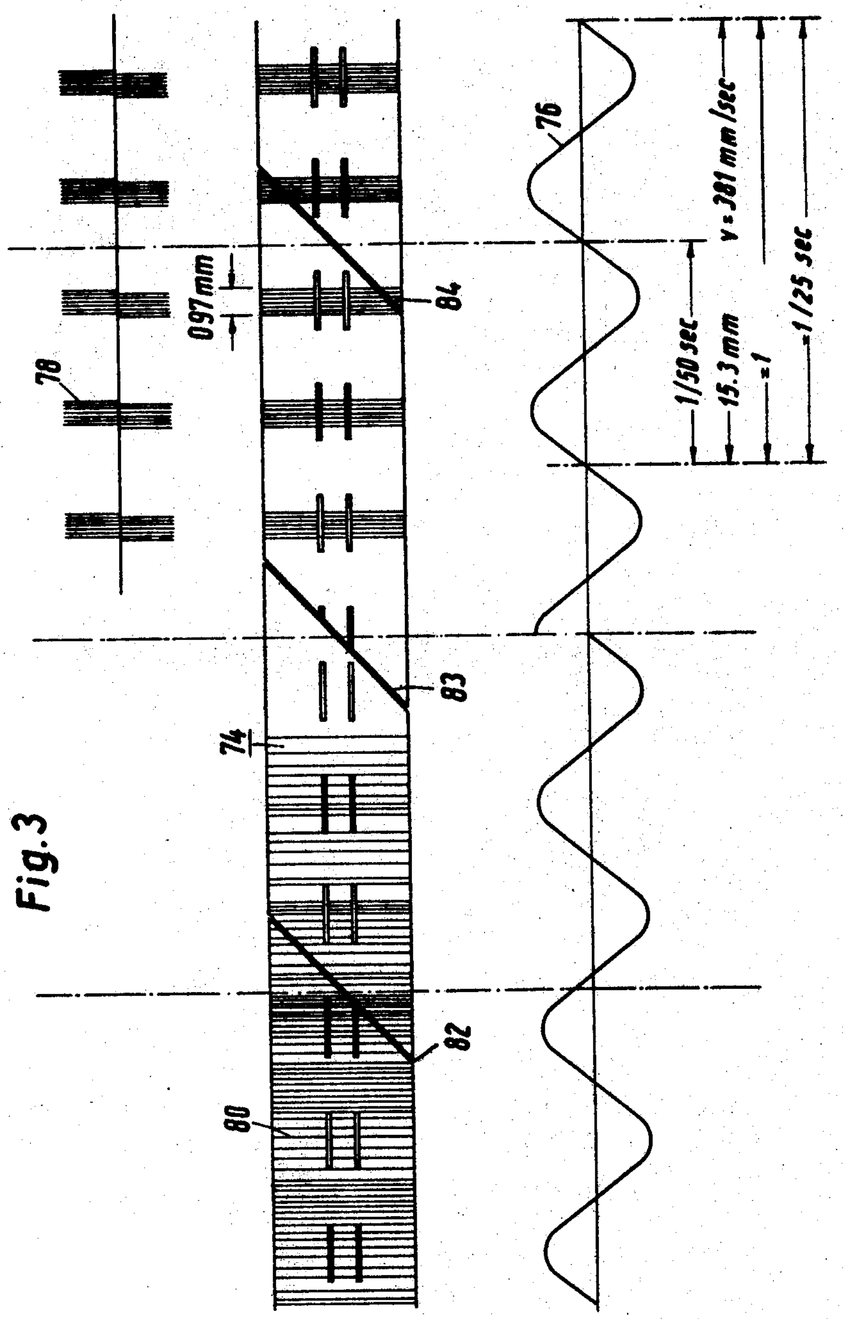
FIG. 3 shows respectively, the recorded modulation, or the impulse frequency and the pilot frequency.

FIG. 3 shows the magnetic picture of the recorded modulation 80 in longitudinal magnetization and of the pilot frequency 76 in lateral magnetization on the magnetic tape 74. The corresponding sinusoidal shape of the pilot frequency is shown underneath. The impulses are shown at 78. Three cutting points are marked on the tape 74. The cutting point 82 represents a point with congruous phase, as well as the cutting point 84. On the other hand, at 83, a cut is shown with shifted phase. Such phase jumps, occasioned by cuts, naturally cause timing error in the follower control which prevent, in accumulation, the picture-synchronous composition. The invention makes it possible to mark the correct cutting position simply by means of a mechanical measurement from the first or last impulse 78. This impulse may be detected by any suitable electronic device. However, a particularly simple arrangement is obtained if the impulse, recorded at audio frequency, is monitored by means of a loudspeaker or earphones, enabling the position relative to the gap of the magnetic head to be very accurately adjusted.

Figure 5:
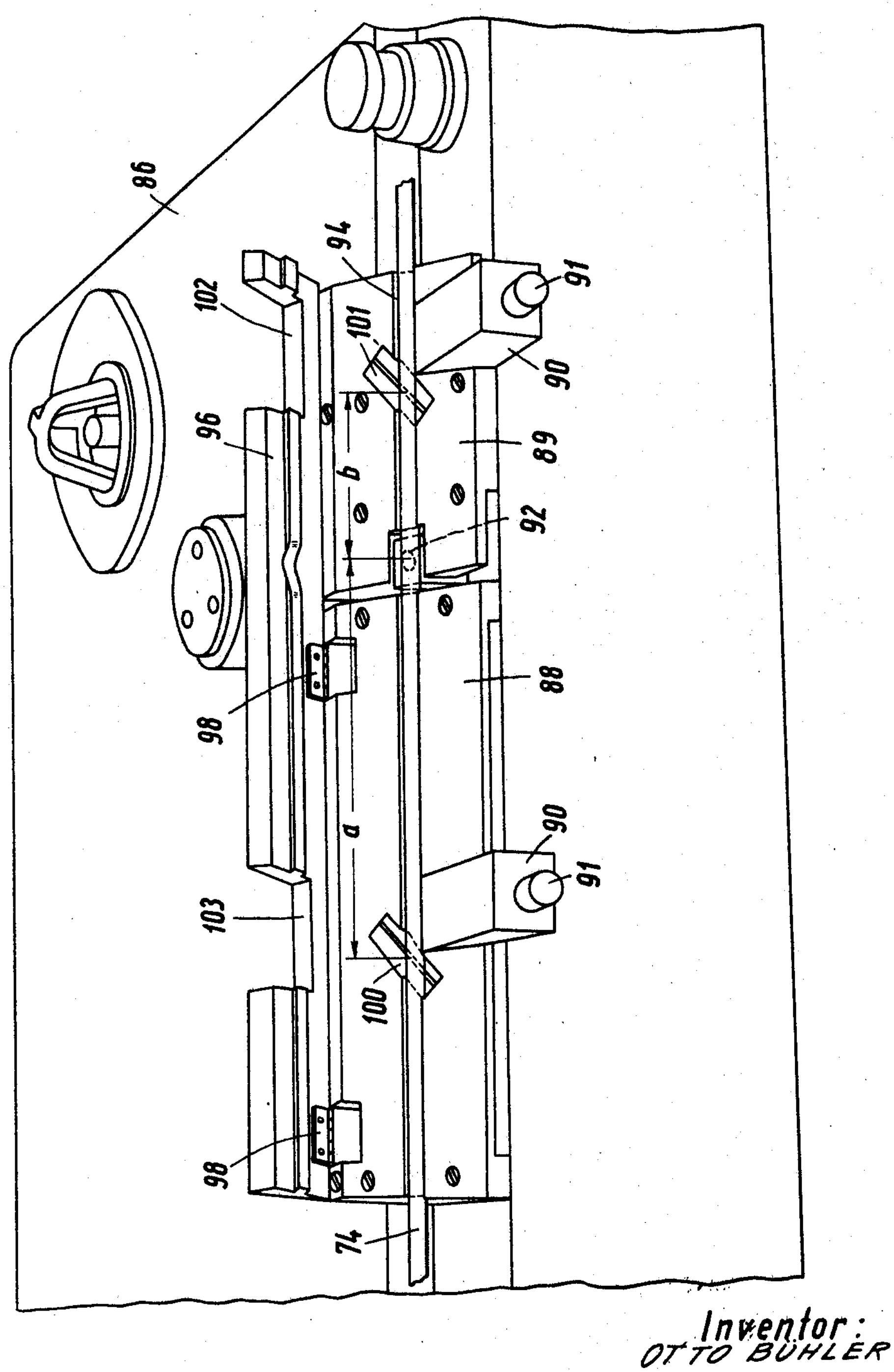
FIG. 5 shows the cutting gage connected to a magnetic sound apparatus.

According to a further feature of the invention, the cutting of the tape is further facilitated by a cutting gage, such as is shown in FIG. 5. This cutting gage is adapted to be attached to a magnetic tape recording apparatus 86 and comprises a fixed rail 88 and a carriage 89 movable relative to this rail and fixable in any position. Handles 90 serve for the relative adjustment and setting of the two parts 88 and 89. The rail 88 and the carriage 89 carry in alignment a tape guide 94. A magnetic head 92 is adjustable in the direction of the tape guide 94 in a recess of the carriage 89 within the zone of the tape guide 94.

The fixed rail 88 carries a cutting mechanism 100 and the carriage 89 a cutting mechanism 101. These cutting mechanisms consist, as is known in the art, of two cutting blades adapted to be moved towards each other, of which the fixed blade is located in the plane of the tape guide whilst the movable blade, actuable by means of a push button 91, is lowered from the top on to the tape.

By adjusting the carriage 89 relative to the rail 88, and adjusting the magnetic head 92 relative to the fixed rail 88 or the carriage 89, the distances *a* and *b* between the cutting gages and the magnetic head 92 can be accurately fixed. These distances depend through the mechanical distances of the first and last grids, respectively, on the start of the picture on the starter film.

A cover 96 is hinged to the fixed rail 88 by hinges 98, and has recesses 103 and 102, respectively, for the cutting points 100 and 101. The inside of this cover is provided with a frictional lining, such as of rubber or synthetic resin and is so formed that it holds the tape in the tape guide when the cover is lowered, enabling the required cuts to be effected without incurring the danger of subsequent displacement.

I claim:

1. A method for cutting picture synchronized sound recording, on a pilot frequency controlled magnetic tape, comprising: connecting a starter film between the start and the end of a film strip section to be synchronized and forming the said film strip section into an endless loop, recording at least one impulse in locked phase relationship to the pilot frequency or other mechanical or magnetic, periodical, markings on the magnetic tape, obtaining an impulse by reflecting an optical marking in said starter film out of the projecting beam of the projector, effecting a cut at a point located at a fixed distance from the recorded impulse, corresponding in time to the distance between the said optical marking of the starter film and the picture start or end, respectively.

2. A method as set forth in claim 1, wherein an optically detectable marking is provided at least near the start and end of the picture in the starter film, which is recorded near the start or end of the magnetic tape section, and wherein the cut is effected always at a fixed distance in front of, or behind, the associated impulse.

3. A method as set forth in claim 2, wherein by optically scanning optical markings in each individual frame of the starter film, an impulse sequence frequency is recorded in locked phase relation to the pilot frequency, and the cut is effected at a fixed distance from the first or last impulse.

4. A method as set forth in claim 3, wherein, in order to arrive at a clear distinction between the optical markings of the starter film and the picture content of the picture film, the optical markings have the form of alternating light and dark informations, the scanning of which yields an impulse frequency which can be read by a magnetic head and defines thereby the point of the tape from which the distance of the cut is to be measured.

5. A method as set forth in claim 4, wherein the said impulse frequency is in the audio frequency range between 2000 and 4000 cycles per second, for example.

6. A method as set forth in claim 4, wherein the impulses are monitored by passing the magnetic tape alongside the magnetic head, the tape is fixed to the magnetic head by the associated characteristic impulse, and the cut is effected by means of a gage set at the fixed distances.

7. A method as set forth in claim 1, wherein the optical markings of the starter film reflected out of the projector beam are detected by photo-electric switching means which scan the picture of the optical marking synchronously to the frame change frequency of the projector and pass preferably along an arcuate path past the reproduction of the markings.

8. A method as set forth in claim 7, wherein the picture marking of each starting film frame is scanned twice by impulse switching photodiodes.

9. A method as set forth in claim 8, wherein a pilot frequency generator is rotated in unison with the impulse photodiodes.

10. A method as set forth in claim 8, wherein the output of the impulse photodiodes is passed through a narrow band amplifier.

11. A method as set forth in claim 10, wherein the said narrow band amplifier is switched between the impulse frequency and the modulation as a function of an impulse applied thereto.

12. A method as set forth in claim 9, wherein the phase position of the rotating impulse photodiodes relative to the phase of the frame change frequency, synchronous therewith, is controlled by co-rotating photoelectric switching diodes, as a function of the light phase in the projector beam path.

13. A method as set forth in claim 12, wherein the drive motor for the photoelectric cells is a hysteresis motor, the pole formation of which is controlled by the switching diodes, after the motor has run up to speed.

14. A method as set forth in claim 1, wherein the picture information is transferred from a video tape to a motion picture film, and thereafter by reflecting the optical marking in the starter film fixed to the motion picture film, the impulse defining the cutting position is recorded, and after combining the sections of the magnetic sound tape, the resulting sound track is mixed with music and further sound and recorded on the sound track of the video tape.

15. A method as set forth in claim 1 wherein, each frame of said starter film with the exception of a few frames at the start and at the end of said film is provided with a grid of vertically extending bars for distinguishing said optical marking in said starter film from the picture content of said film strip section.

16. A method as set forth in claim 15, wherein the grid of vertically extending bars of said starter film extends over substantially two-thirds of the height of said frames, and wherein starting trigger symbols are provided occupying the remaining third of the height of said frames for use in synchronizing the cutting of said film strip section.

17. A method as set forth in claim 15, wherein the grid of vertically extending bars comprises eight bars.

18. Apparatus for locating a splice point on a tape, said apparatus including a projector for a film operable at a predetermined frame change rate and having a beam path along which information recorded on film played by said projector is directed, a rotor operable synchronously at said frame change rate, a pair of impulse photodiodes mounted at the periphery of said rotor and diametrically opposed, a pair of switching photodiodes mounted at the periphery of said rotor and diametrically opposed, a partly transparent mirror disposed along said beam path and directing part of such information transverse to said beam path against the periphery of said rotor whereby said diodes generate signals related to said part of such information, and means for recording said signals on said tape as synchronized splice locating information.

19. An aparatus as set forth in claim 18, wherein the rotor is equipped with pre-amplifiers for the said photodiodes.

20. An apparatus as set forth in claim 19, wherein the output of the preamplifiers is applied to sliprings running along collector brushes.

21. An apparatus as set forth in claim 19, wherein the output of the switching and impulse diodes, respectively, is transmitted from the rotor in a contact-less manner.

22. An apparatus as set forth in claim 18, also including a synchronous motor for driving said rotor, a reduction gearing interposed between the synchronous motor and the rotor for adapting the same to a particular frame change frequency other than that obtained by direct drive from said synchronous motor.

23. An apparatus as set forth in claim 18, also including an optical reproduction system interposed between said mirror and said rotor, with the picture plane of the optical reproduction system located along the periphery of the rotor and extending over a small arc thereof.

References Cited

UNITED STATES PATENTS

| | | | |
|---|---|---|---|
| 2,310,340 | 2/1943 | Arndt | 352—24 |
| 2,567,086 | 9/1951 | Stoltz | 352—23 |
| 2,673,485 | 3/1954 | Roderick | 352—24 |
| 2,928,311 | 3/1960 | Strauss | 352—44 |
| 2,976,765 | 3/1961 | Banno | 352—20 |
| 3,196,454 | 7/1965 | Fine | 352—24 |
| 3,266,862 | 8/1966 | Wagoner | 352—12 |

FOREIGN PATENTS

| | | |
|---|---|---|
| 715,595 | 9/1954 | Great Britain. |
| 797,278 | 7/1958 | Great Britain. |

NORTON ANSHER, Primary Examiner

M. H. HAYES, Assistant Examiner

U.S. Cl. X.R.

352—12